(12) United States Patent
Laiho

(10) Patent No.: US 6,952,723 B1
(45) Date of Patent: Oct. 4, 2005

(54) METHOD AND SYSTEM FOR CORRECTING INVALID HYPERLINK ADDRESS WITHIN A PUBLIC NETWORK

(75) Inventor: Keijo Laiho, Masala (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/890,557

(22) PCT Filed: Feb. 2, 2000

(86) PCT No.: PCT/FI00/00074

§ 371 (c)(1),
(2), (4) Date: Nov. 29, 2001

(87) PCT Pub. No.: WO00/46696

PCT Pub. Date: Aug. 10, 2000

(30) Foreign Application Priority Data

Feb. 2, 1999 (FI) .................................... 990192

(51) Int. Cl.⁷ ............................................ G06F 15/16
(52) U.S. Cl. ....................... 709/217; 709/218; 709/219
(58) Field of Search ............................... 709/217, 218, 709/219

(56) References Cited

U.S. PATENT DOCUMENTS

| | | | | |
|---|---|---|---|---|
| 5,572,643 A | * | 11/1996 | Judson | 709/218 |
| 5,751,956 A | | 5/1998 | Kirsch | |
| 5,918,012 A | * | 6/1999 | Astiz et al. | 709/217 |
| 6,029,200 A | * | 2/2000 | Beckerman et al. | 709/226 |
| 6,035,330 A | * | 3/2000 | Astiz et al. | 709/218 |
| 6,088,515 A | * | 7/2000 | Muir et al. | 709/217 |
| 6,370,570 B1 | * | 4/2002 | Muir et al. | 709/217 |
| 6,565,608 B1 | * | 5/2003 | Fein et al. | 715/501.1 |

FOREIGN PATENT DOCUMENTS

JP         10333966 A         12/1998

* cited by examiner

Primary Examiner—Krisna Lim

(57) ABSTRACT

A method of facilitating the correction of an incorrect hyperlink contained in a source web page stored on a first web server (7) at an address identified by a first Universal Ressource Locator (URL) and which hyperlink points to a second URL at a second web server (8). The method comprises copying the source page from the first web server (7) to a browser of a client computer (2) via the Internet, and selecting the incorrect hyperlink at the browser so as to transmit a URL resource retrieval request from the browser to the second web server (8). The request is received at the second web server (8) which responds by returning to the browser a corrected URL. The connected URL and said first URL are transmitted from the browser to said first web server (7).

9 Claims, 2 Drawing Sheets

METHOD AND SYSTEM FOR CORRECTING INVALID HYPERLINK ADDRESS WITHIN A PUBLIC NETWORK

FIELD OF THE INVENTION

The present invention relates to addressing in the Internet and more particularly to hyperlinks such as are used in the World Wide Web.

BACKGROUND TO THE INVENTION

Growth in the use of the Internet, and in particular that part of the Internet known as the World Wide Web (WWW), has been extremely rapid in recent years. Much of the success of the WWW is due to the simple and efficient way in which an enormous number of separate documents (or files) may be linked together, allowing a user to browse through related documents merely at the click of a mouse button.

WWW documents (or pages) are written in a language known as Hyper Text Mark-up Language (HTML) which lies somewhere between conventional computer programming languages and plain English text. A link to a page on a WWW server may be included in some other WWW page by including the Universal Resource Locator (URL) of the "referenced" page in the HTML file corresponding to the "referring" page. For example, if one wished to include a link to the WWW page of the European Patent Office in some other WWW page, then the following line could be added to the corresponding HTML file:

<A HREF="http://www.european-patent-office.org"> European Patent Office</A>

This would result in the WWW page displaying "European Patent Office" as a clickable link.

A common source of annoyance for users of the WWW is the return of a message, after a link has been clicked, indicating that the WWW page at the requested URL cannot be located. This situation often results from WWW pages being deleted from a WWW server or alternatively being relocated to a new URL.

Redirection tools are available for redirecting an original request to an out of date URL, to a new URL. Typically, this involves running an application at a WWW server where the requested page is located, and which intercepts requests to the URL and replaces them with a request to the new URL. Whilst this results in the correct page being delivered to the Web browser from which the request originated, it does not address the fundamental problem, i.e. the incorrect URL incorporated into the clicked hyperlink.

SUMMARY OF THE PRESENT INVENTION

It is an object of the present invention to overcome or at least mitigate the disadvantages outlined in the preceding paragraph. In particular, it is an object of the present invention to correct or facilitate the correction of an incorrect hyperlink in a WWW page.

According to a first aspect of the present invention there is provided a method of facilitating the correction of an incorrect hyperlink contained in a file stored on a first network server at an address identified by a first resource locator and which hyperlink points to a second resource locator at a second network server, the method comprising:

copying said file from said first network server to a browser of a client computer via the network;

selecting said hyperlink at the browser so as to transmit a resource locator retrieval request from the browser to said second network server;

receiving said request at the second network server and responding by returning to the browser a resource locator error message; and automatically transmitting the resource locator error message from the browser to said first network server.

Embodiments of the present invention provide for the automatic transmission of the resource locator error message to the server at which the file containing the incorrect resource locator is maintained. This enables corrective action to be taken at that server, e.g. the automatic or manual correction of the resource locator.

Preferably, the error message transmitted from the browser to the first network server includes said first resource locator.

Preferably, the error message transmitted from the browser to the first network server includes said second resource locator.

Preferably, the error message returned from the second network server to the browser, and transmitted from the browser to the first network server, contains a corrected resource locator provided by the second network server.

Preferably, the network to which the servers and the client computer are connected is the Internet, and said resource locators are Universal Resource Locators (URLs). More preferably, said file containing the incorrect hyperlink is an HTML file and forms part of the information network known as the World Wide Web. In this case, said browser is a Web browser. Alternatively, the file may have some other format and/or the network may function according to some other non-Internet protocol.

The first network server may, upon notification of an incorrect URL/hyperlink from a client's browser, automatically transmit a URL download request to the incorrect URL. In response to this request, the second network server will again return a corrected URL to the first network server. In this way, confirmation of the original browser notification may be achieved.

According to a second aspect of the present invention there is provided apparatus for facilitating the correction of an incorrect hyperlink contained in an electronic file, the apparatus comprising;

a first network server having a memory for storing said file at an address identified by a first resource locator, said hyperlink pointing to a second resource locator at a second network server;

a client computer arranged to copy said file from said first network server to a browser of the client computer, via the network, and to transmit a resource locator retrieval request from the browser to said second network server upon selection of said hyperlink; and a second network server arranged to receive said request and to respond by returning to said browser an error message, wherein the client computer is further arranged to transmit the error message, from the browser, to said first network server.

According to a third aspect of the present invention there is provided a computer memory encoded with executable instructions representing a computer program for causing a computer system connected to a data network to:

transmit a resource locator retrieval request to a first network server over a data network;

download an electronic file from the first network server and which is stored at an address identified by said resource locator, the file containing a hyperlink pointing to a resource locator at a second network server;

in response to selection of the hyperlink, transmit a resource locator retrieval request to said second network server;

in the event that the second mentioned resource locator is incorrect, to receive from the second network server an error message; and transmit the error message to said first network server.

BRIEF DESCRIPTION OF THE DRAWINGS

For a better understanding of the present invention and in order to show how the same may be carried into effect reference will now be made by way of example to the accompanying drawings, in which.

DETAILED DESCRIPTION OF THE CERTAIN EMBODIMENTS

Figure 1:
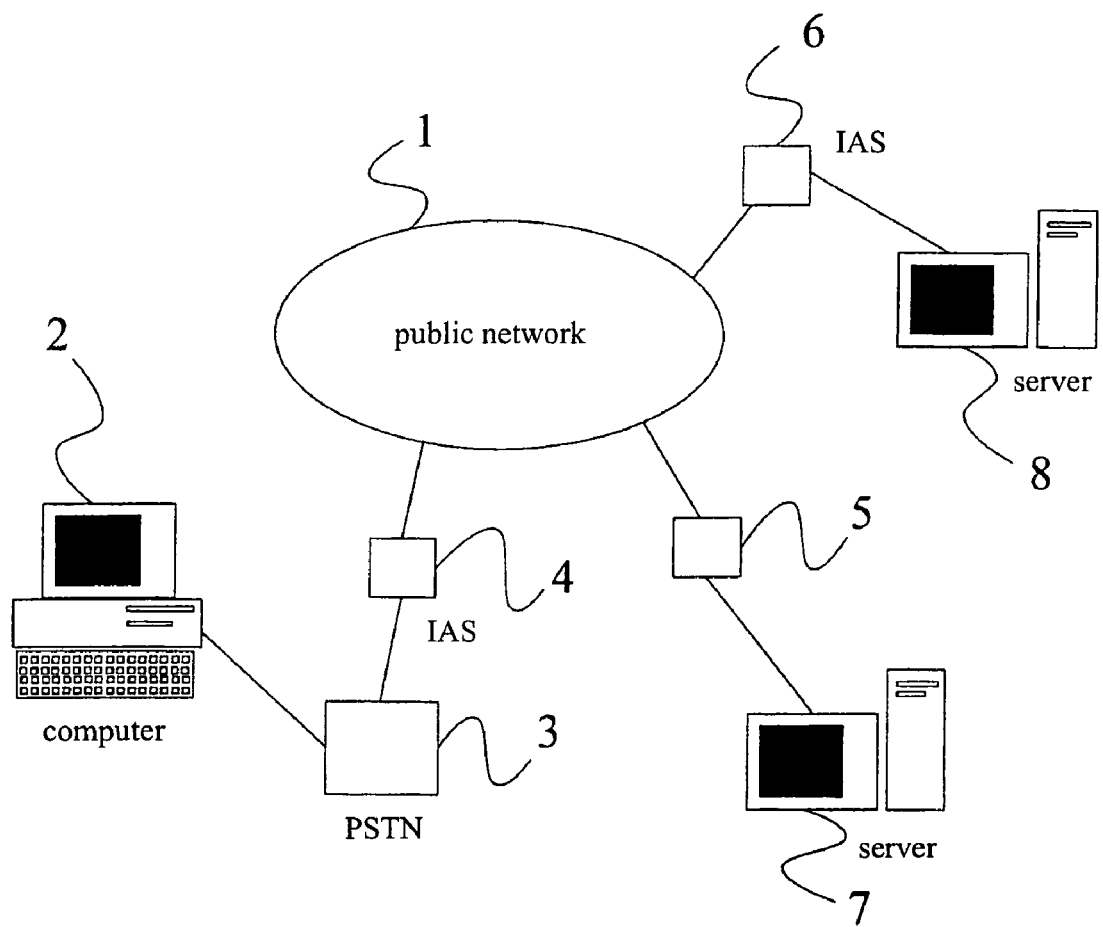
FIG. 1 illustrates schematically a portion of the Internet.

There is illustrated in FIG. 1 a portion of the Internet which includes a "public" network 1 comprising a large number of interconnected routers (not shown in the Figure). A client computer 2, e.g. that belonging to a home user, is connected to the public network 1 via a PSTN telephone network 3 and an Internet Access Server 4. Also connected to the public network 1 via respective Internet Access Servers 5,6 are a pair of network servers 7,8. It will be appreciated that the client computer 2 and the networks servers 7,8 are in practice supplemented by a great number of similar computers. Furthermore, the precise details of the connectivity of these computers to the public network 1 may vary greatly, e.g. in many cases computers will be connected to the public network 1 via private intranets.

In order to access the information network known as the World Wide Web (WWW) which is available over the Internet, the client computer 2 is provided with a so-called web browser. This is a software application running on the computer 2; current examples include Netscape Navigator™ and Microsoft Explorer™. The WWW relies upon a document creation language known as Hyper Text Mark-up Language (HTML), and web browsers are designed to interpret documents written in this language for display at the client computer 2. HTML provides for the incorporation of hyperlinks into WWW documents as has already been described above.

Figure 2:
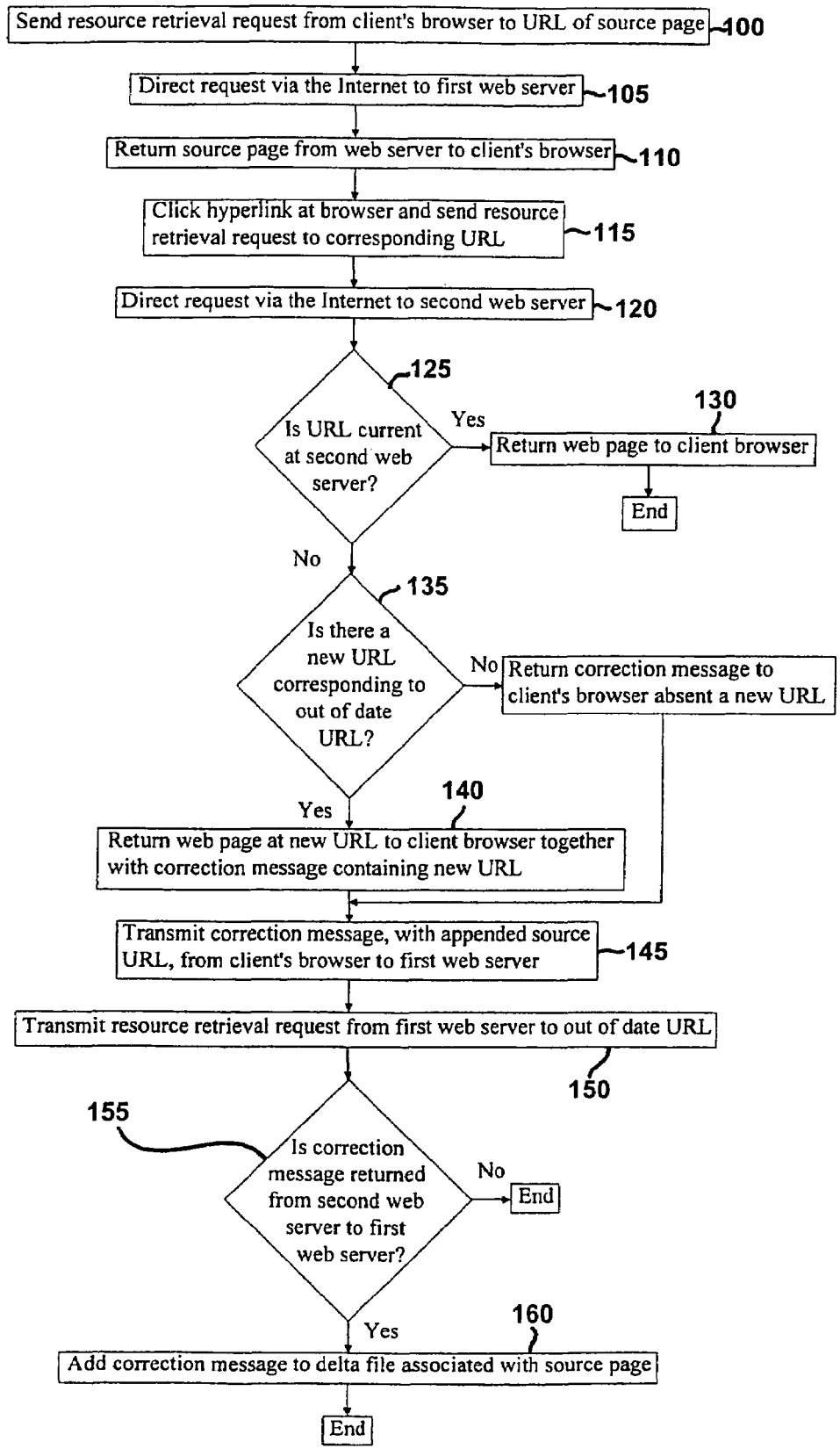
FIG. 2 is a flow diagram illustrating a method of operation of the Internet portion of FIG. 1.

Consider now a situation where the web browser at the client computer 2 sends a specific URL resource retrieval request to the public network 1 via the PSTN 3 and the associated IAS 4, where the URL is an address located at a first of the network servers 7 (in this context, the network servers 7,8 may be referred to as "web servers")(FIG. 2 step 100). This request is routed to the first server 7 (step 108), which recognises the request and responds by returning the page (referred to below as the "source" page) located at the URL to the public network 1 which in turn routes the page to the client computer 2 from which the request originated (step 110). The received web page is then displayed at the client computer 2 by the web browser.

Normally, the web page returned to the client computer's browser will contain one or more hyperlinks. Now assume that one of these hyperlinks contains an out of date URL, which URL points to a location on the second network server 8 which is no longer valid, i.e. because the web page previously maintained at that location has been moved to a new location (also at the second server 8). In the event that the user selects the incorrect hyperlink by clicking on the link, the browser transmits a URL resource retrieval request to the second network server 8 over the Internet (step 115). The second server 8 receives the request (step 120), and checks to see whether or not the associated URL is valid (step 128). If the answer is yes, the server retrieves the requested page, and returns it to the web browser at the client computer 2 (step 130). However, if the requested URL does not exist, then the server 8 proceeds as follows.

Firstly, the server 8 seeks to determine if the requested page has been moved to a new URL. For this purpose, the server may maintain a look-up table mapping old URLs to new URLs (step 135). If a new URL is identified, then the server 8 returns the page located at the new URL to the client computer's web browser, where the page is displayed (step 140). Secondly, the server 8 returns a "correction" message to the client computers web browser notifying the browser that the requested URL is out of date, and providing the new URL (step 145). In the event that the second network server 8 is unable to identify a new URL for an out of date URL, a message may nonetheless be sent to the client computer's browser indicating that the requested URL is unavailable.

The browser responds to the correction message by automatically relaying the message to the first network server 7 and from which the web page having the incorrect URL originated. The browser appends to the correction message an identification of the incorrect URL. This process may occur without the involvement of the user of the web browser.

The first network server 7 responds to receipt of the correction message by automatically transmitting a resource retrieval request to the incorrect URL (step 150). The second server 8 will respond to receipt of this request as has already been described above, i.e. by returning the page located at the new URL, together with a correction message containing the new URL (if indeed a new URL is available) (step 155). The first network server 7 takes this new message as confirmation of the correction message returned from the client computers, and thereafter stores the message in a data file associated with the source page (step 160).

Subsequent resource retrieval requests made to the first network server 7 for the source page, result in the downloading of the data file together with the source page itself. The client computer's browser uses the data file to automatically redirect resource retrieval requests to the corrected URL (or terminate the request if no corrected URL is available). The data file also provides the system administrator responsible for the first network server 7 with information for correcting or updating the source page's HTML file. For this purpose, the administrator may be automatically notified (e.g. by e-mail) of changes to a data file.

FIG. 2 is a flow diagram illustrating further the method of operation of the embodiment described above.

It will be appreciated by the person of skill in the art that various modifications may be made to the above described embodiment without departing from the scope of the present invention. For example, in cases where the source page is stored at a server which provides an Internet search engine capability, a correction message may be used by the server to delete out of date URLs from the search directory. It will also be appreciated that, in cases where a web page has been relocated to a new server, a corrected URL sent by a server to a browser may point to a location on that new server.

What is claimed is:

1. A method of facilitating the correction of an incorrect hyperlink contained in a file stored on a first network server at an address identified by a first resource locator and which hyperlink points to a second resource locator at a second network server, the method comprising:

copying said file from said first network server to a browser of a client computer via the network;

selecting said hyperlink at the browser so as to transmit a resource locator retrieval request from the browser to said second network server;

receiving said request at the second network server and responding by returning to the browser a resource locator error message;

automatically transmitting the resource locator error message from the browser to said first network server; and wherein in the event there is a corrected resource locator provided by said second network server, transmitting said corrected resource locator with said error message.

2. A method according to claim 1, wherein the error message transmitted from the browser to the first network server includes said first resource locator.

3. A method according to claim 1, wherein the error message transmitted from the browser to the first network server includes said second resource locator.

4. A method according to claim 1, wherein the network to which the servers and the client computer are connected is the Internet, and said resource locators are Universal Resource Locators (URLs).

5. A method according to claim 1, wherein the file containing the incorrect hyperlink is an HTML file.

6. A method according to claim 5, wherein said browser is a Web browser.

7. A method according to claim 1, wherein the first network server, upon notification of an incorrect hyperlink from a client's browser, automatically transmits a resource locator download request to the incorrect resource locator.

8. Apparatus for facilitating the correction of an incorrect hyperlink contained in an electronic file, the apparatus comprising;

a first network server having a memory for storing said file at an address identified by a first resource locator, said hyperlink pointing to a second resource locator at a second network server;

a client computer arranged to copy said file from said first network server to a browser of the client computer, via the network, and to transmit a resource locator retrieval request from the browser to said second network server upon selection of said hyperlink; and a second network server arranged to receive said request and to respond by returning to said browser an error message, wherein the client computer is further arranged to transmit the error message, from the browser, to said first network server and wherein said error message contains a corrected resource locator provided by the second network server.

9. A computer memory encoded with executable instructions representing a computer program for causing a computer system connected to a data network to:

transmit a resource locator retrieval request to a first network server over a data network;

download an electronic file from the first network server and which is stored at an address identified by said resource locator, the file containing a hyperlink pointing to a resource locator at a second network server;

in response to selection of the hyperlink, transmit a resource locator retrieval request to said second network server;

in the event that the second mentioned resource locator is incorrect, to receive from the second network server an error message; and transmit the error message to said first network server wherein in the event a corrected resource locator is associated with said resource locator, providing said corrected resource locator with said error message.

* * * * *